United States Patent
Ping et al.

(10) Patent No.: US 12,212,604 B2
(45) Date of Patent: Jan. 28, 2025

(54) METHOD AND APPARATUS FOR SECURITY ASSURANCE OF A NETWORK OR MANAGEMENT FUNCTION

(71) Applicant: Nokia Technologies Oy, Espoo (FI)

(72) Inventors: Jing Ping, Chengdu (CN); Xiaoming She, Chengdu (CN); Shuqiang Sun, Chengdu (CN); Wei Lu, Beijing (CN); Stéphane Mahieu, Munich (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 559 days.

(21) Appl. No.: 17/607,082

(22) PCT Filed: Apr. 29, 2019

(86) PCT No.: PCT/CN2019/085044
§ 371 (c)(1),
(2) Date: Oct. 28, 2021

(87) PCT Pub. No.: WO2020/220217
PCT Pub. Date: Nov. 5, 2020

(65) Prior Publication Data
US 2022/0239700 A1     Jul. 28, 2022

(51) Int. Cl.
*H04L 9/40*       (2022.01)
*H04L 41/40*     (2022.01)
*H04L 43/50*     (2022.01)

(52) U.S. Cl.
CPC .............. *H04L 63/20* (2013.01); *H04L 41/40* (2022.05); *H04L 43/50* (2013.01)

(58) Field of Classification Search
CPC ......... H04L 63/20; H04L 41/40; H04L 43/50; H04L 67/10
See application file for complete search history.

(56) References Cited

U.S. PATENT DOCUMENTS 10,949,406 B1 * 3/2021 Calvo ................. G06F 16/215
2010/0050229 A1   2/2010 Overby, Jr.
(Continued)

FOREIGN PATENT DOCUMENTS

| CN | 101447898 A | 6/2009 |
|---|---|---|
| CN | 103795707 A | 5/2014 |
| CN | 105897766 A | 8/2016 |
| CN | 106549792 A | 3/2017 |
| CN | 108900328 A | 11/2018 |

(Continued)

OTHER PUBLICATIONS

"3rd Generation Partnership Project; Technical Specification Group Services and System Aspects; Security Assurance Methodology (SECAM) and Security Assurance Specification (SCAS) for 3GPP virtualized network products (Release 16)", 3GPP TR 33.818, V0.1.0, Nov. 2018, pp. 1-13.

(Continued)

*Primary Examiner* — Ellen Tran
(74) *Attorney, Agent, or Firm* — Lippes Mathias LLP

(57) ABSTRACT

Embodiments of the present disclosure provide a method and apparatus for security assurance of a network function or service. The method comprises: generating security requirements for a network function based on a security profile and a deployment and runtime environment of the network function; generating a security policy and a security test specification for the network function based on the security requirements; deploying the network function based on the security policy; validating security compliance of the network function with the security test specification; and activating the network function or service, in response to the network function being in compliance with the security policy.

17 Claims, 7 Drawing Sheets

(56) References Cited

U.S. PATENT DOCUMENTS

| | | | |
|---|---|---|---|
| 2010/0125897 A1* | 5/2010 | Jain | H04L 63/0272 |
| | | | 713/193 |
| 2017/0078143 A1 | 3/2017 | Zhao | |
| 2017/0134538 A1 | 5/2017 | Mahkonen et al. | |
| 2017/0134590 A1 | 5/2017 | Mathison | |
| 2017/0155681 A1 | 6/2017 | Ashley et al. | |
| 2018/0278478 A1* | 9/2018 | Prasad | H04L 41/0894 |
| 2020/0007584 A1* | 1/2020 | Dixit | H04L 41/0893 |

FOREIGN PATENT DOCUMENTS

| | | |
|---|---|---|
| CN | 109062752 A | 12/2018 |
| CN | 109246159 A | 1/2019 |

OTHER PUBLICATIONS

"3rd Generation Partnership Project; Technical Specification Group Services and System Aspects; Catalogue of general security assurance requirements (Release 15)", 3GPP TS 33.117, V15.1.0, Sep. 2018, pp. 1-92.

"3rd Generation Partnership Project; Technical Specification Group Services and System Aspects; Security Assurance Methodology (SCAS) for 3GPP network products (Release 15)", 3GPP TR 33.916, V15.0.0, Jun. 2018, pp. 1-40.

Li, "Identifying Security Requirements Based on Linguistic Analysis and Machine Learning", 24th Asia-Pacific Software Engineering Conference (APSEC), Dec. 4-8, 2017, pp. 388-397.

Li et al., "Intelligent 5G: When Cellular Networks Meet Artificial Intelligence", IEEE Wireless Communications, vol. 24, No. 5, Oct. 2017, pp. 1-10.

International Search Report and Written Opinion received for corresponding Patent Cooperation Treaty Application No. PCT/CN2019/085044, dated Feb. 11, 2020, 9 pages.

Extended European Search Report received for corresponding European Patent Application No. 19927441.6, dated Sep. 27, 2022, 8 pages.

Office Action received for corresponding Chinese Patent Application No. 201980097838.8, dated Feb. 29, 2024, 7 pages of Office Action and no page of translation available.

* cited by examiner

101

201
Determine original security requirements according to the security profile and the deployment requirement and runtime environment of the NF 203
Identify semantically identical security requirements and semantically similar security requirements from the original security requirements 205
Remove the extra semantically identical security requirements 207
Combine the semantically similar security requirements into a combined security requirement 209
Add the missing security requirement

Figure 2

METHOD AND APPARATUS FOR SECURITY ASSURANCE OF A NETWORK OR MANAGEMENT FUNCTION

RELATED APPLICATION

This application was originally filed as PCT Application No. PCT/CN2019/085044, filed on Apr. 29, 2019, of which is incorporated herein by reference in its entirety.

TECHNICAL FIELD

The present disclosure generally relates to the field of network and service development and operation, and more specifically to a method and apparatus for security assurance automation for a network function (NF) or a management function (MnF) or a service.

BACKGROUND

In 5G network, NF security is a critical issue. Due to increasing complexity of an NF in the 5G network and new technologies and development processes for the NF, NF vendors and operators may not invest efficiently and effectively into the NF security during whole NF development and operation. Consequently, they are very likely exposed to service unavailability, critical data loss/theft or breach of their intellectual property and reputation.

Verticals introduced in 5G bring diversity of security requirements from various industries. Also, country/region specific security laws and regulations became obligatory for service providers and their supply chains, which cover different security requirements and require different levels of security compliance.

NF virtualization (NFV)/software defined network (SDN) enables the NF in 5G to be developed, test, deployed and updated automatically, so as to allow the NF operators to quickly deliver new features to their customers. Currently there are many standardization specifications and open source projects to support 5G network and network slice deployment and update automation. However, existing NF security assurance methodology defined by the Third Generation Partnership Project (3GPP) and Global System for Mobile Communications Association (GSMA) is still based on static security requirements definition and manually validation. Therefore, such the NF security assurance methodology cannot adapt the NF development and operation in 5G. Moreover, there are many security test tools suggested by 3GPP and GSMA to support NF test and deployment automation. But these tools can only facilitate NF security test automation. The NF Security assurance in other NF development and operation stages still requires human intervening, especially relied on security experts to carry out risk analysis, define security requirements, design a security solution, develop test cases, execute test plan, analyze security reports and provide a fix plan if needed. This is difficult, time-consuming and prone to problems.

Therefore, it is desirable to provide a more effective solution to automate the NF security assurance during a whole NF development and operation lifecycle.

SUMMARY

The present disclosure is going to solve the aforementioned problems by proposing a method and apparatus for security assurance automation, in order to automate the security assurance during a whole development and operation lifecycle of the NF or MnF or service. Other features and advantages of embodiments of the present disclosure will also be understood from the following description of specific embodiments when read in conjunction with the accompanying drawings, which illustrate, by way of example, the principles of embodiments of the present disclosure.

In a first aspect of the present disclosure, there is provided a method for security assurance automation. The method comprises: generating security requirements for an NF based on a security profile and a deployment and runtime environment of the NF; generating a security policy and a security test specification for the NF based on the security requirements, the security policy defining a security function and a configuration of the security function, and the security test specification defining at least one security test; deploying the NF and the security function based on the security policy; validating security compliance of the NF with the security test specification; and activating the NF in response to the NF being in compliance with the security policy.

In some embodiments, the generating the security requirements may comprise: determining original security requirements according to the security profile and the deployment requirement of the NF; identifying semantically identical security requirements and semantically similar security requirements from the original security requirements; removing the extra semantically identical security requirements; and combining the semantically similar security requirements into a combined security requirement, the combined security requirement having the highest security degree.

In some embodiments, the identifying semantically identical security requirements and semantically similar security requirements from the original security requirements may comprise: calculating semantic similarities between the original security requirements; identifying the security requirements with the semantic similarity greater than a first threshold as the semantically identical security requirements; and identifying the security requirements with the semantic similarity greater than a second threshold as the semantically similar security requirements.

In some embodiments, the combining the semantically similar security requirements into a combined security requirement may comprise: ranking the semantically similar security requirements based on security degrees of the semantically similar security requirements; selecting the semantically similar security requirement which has the highest security degree; and removing the remaining semantically similar security requirements.

In some embodiments, the security degree of the security requirement may be represented by at least one of a granularity of the security requirement and a security level of the security requirement.

In some embodiment, the generating the security requirements may further comprise: checking whether there is any missing security requirement in the generated security requirements based on a predefined security requirement baseline, the security requirement baseline comprising default security requirements required for the NF; and adding, in response to the presence of the missing security requirement, the missing security requirement to the generated security requirements.

In some embodiments, the security profile may comprise one or more of the followings: hardware and software technology and architecture information; functionalities; and external and internal interfaces.

In some embodiment, the deployment and runtime environment may comprise one or more of the followings: a deployment country/region; an applied industry; a deployment mode; a running ecosystem; and additional requirements provided by an NF vendor, a network operator or a service provider.

In some embodiment, the deployment mode may indicate that the network function is deployed as one of a physical node, a virtualized node, and a hybrid node. In some embodiment, the running ecosystem may indicate that a communication network in which the NF will operate is one of a public network, a private network, and a hybrid network.

In some embodiments, the generation of the security requirements and the security test specification may be implemented in an intelligent model.

In some embodiment, the security test may comprise a test case, one or more test tools which are used to execute the test case, a test schedule which defines a scheduling of the test case, and a test configuration for configuring the one or more test tools.

In some embodiment, the validating security compliance of the NF based on the security test specification may comprise: for each of the at least one security test in the security test specification, configuring one or more test tools according to the test configuration; executing the test case according to the test schedule to determine whether the security test is passed; and determining, in response to all of the at least one security test being passed, that the NF is in compliance with the security requirements; and determining, in response to any one of the at least one security test being not passed, that the NF is not in compliance with the security requirements.

In some embodiment, the validating security compliance of the NF based on the security test specification may further comprise: generating a security test report which recommends a subsequent action if the NF is not in compliance with the security requirements.

In some embodiments, the method may further comprise storing the security requirements, the security policy and the security test specification.

In some embodiment, the method may further comprise: monitoring, upon the activation of the NF, a security state of the NF in operation; and generating a security monitoring report, the security monitoring report indicating the monitored security state and recommending a subsequent action if the monitored security state indicates an unsafe state.

In some embodiments, the security test report and the security monitoring report may be generated based on a security report policy for the NF. In one embodiment, the security report policy may define formats and contents of the security test report and the security monitoring report.

In some embodiment, the method may further comprise: updating the security requirements in response to one or more of the followings: a change to the security profile; a change to the deployment and runtime environment of the NF; a change to a security state of the NF; and an update request.

In a second aspect of the present disclosure, there is provided an apparatus for security assurance automation. The apparatus comprises at least one processor and at least one memory including computer executable instructions. The at least one memory and the computer executable instructions configured to, with the at least one processor, cause the apparatus at least to perform any step of the method according to the first aspect of the present disclosure.

In a third aspect of the present disclosure, there is provided a computer readable storage medium having computer executable instructions embodied thereon which, when executed on a computer, cause the computer to perform any step of the method according to the first aspect of the present disclosure.

With the various aspects and embodiments of the present disclosure as mentioned above, a new solution can be provided to automate the NF security assurance during the whole NF development and operation lifecycle.

BRIEF DESCRIPTION OF THE DRAWINGS

The above and other aspects, features, and benefits of various embodiments of the present disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which:

FIG. 2 is a flowchart illustrating a process of generating the security requirements according to some embodiments of the present disclosure;

DETAILED DESCRIPTION

Figure 1:
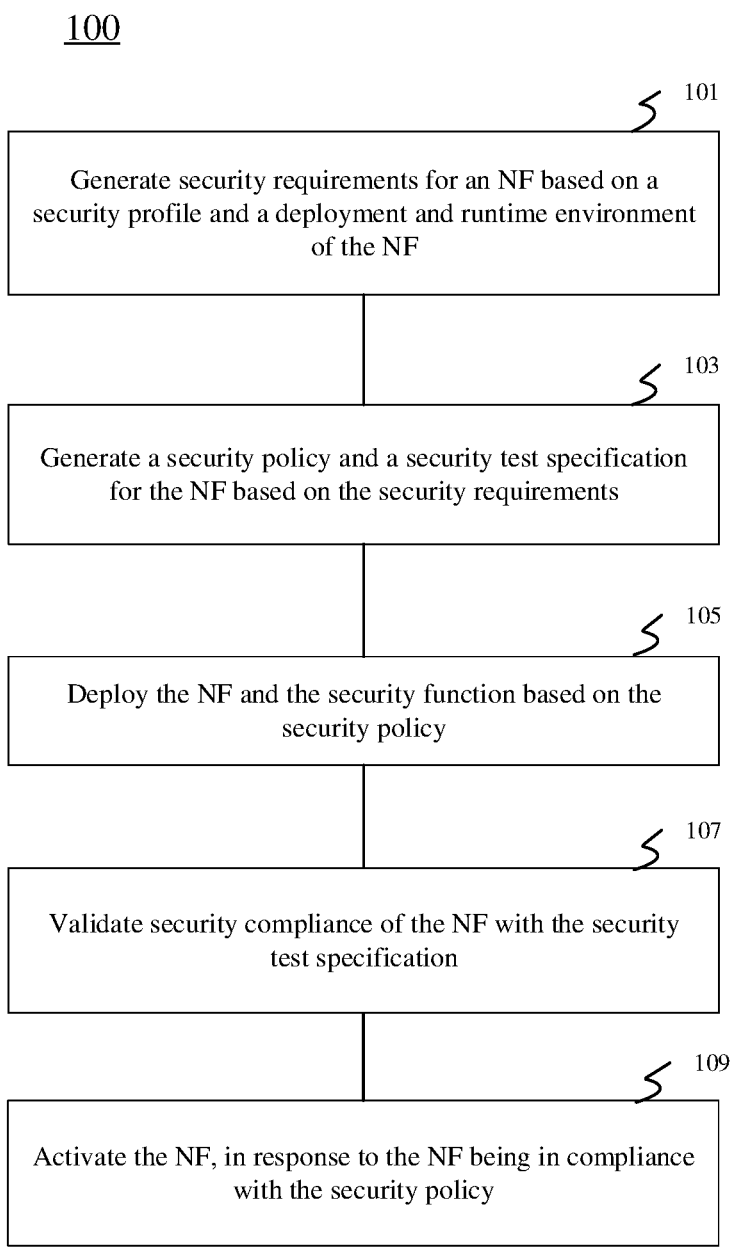
FIG. 1 is a flowchart illustrating a method for NF security assurance automation according to some embodiments of the present disclosure.

Hereinafter, the principle of the present disclosure will be described with reference to illustrative embodiments. It should be understood, all these embodiments are given merely for one skilled in the art to better understand and further practice the present disclosure, but not for limiting the scope of the present disclosure. For example, features illustrated or described as part of one embodiment may be used with another embodiment to yield still a further embodiment. In the interest of clarity, not all features of an actual implementation are described in this specification.

References in the specification to "one embodiment," "an embodiment," "an example embodiment," etc. indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

For illustrative purposes, several embodiments of the present disclosure will be described in the context of a 5G network. Those skilled in the art will appreciate, however, that the concept and principle of the several embodiments of the present disclosure may also be applied to other types of communication network.

As used herein, the term "circuitry" may refer to one or more or all of the following:

(a) hardware-only circuit implementations (such as implementations in only analog and/or digital circuitry); and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions); and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the singular forms "a", "an", and "the" are intended to include the plural forms as well, unless the context clearly indicates otherwise. The term "includes" and its variants are to be read as open terms that mean "includes, but is not limited to". The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

As described above, current NF security assurance methodology is based on the static security requirements and needs human intervening. There is no solution for automating the NF security assurance during the whole NF development and operation lifecycle. With the growing demands of NF security requirements from different country/regions and industries, and the emergence of agile and automatic NF security development and update process and virtualization and programmable technologies, as well as openness of future networks, there is a need for a new methodology to automate NF security assurance during the NF development and operation.

In accordance with some exemplary embodiments, the present disclosure provides a solution for enabling NF security assurance automation during the whole NF development and operation lifecycle. The solution may be applied to any type of communication network, such as 5G network.

FIG. 1 is a flowchart illustrating a method 100 for security assurance automation of an NF according to embodiments of the present disclosure. The method 100 illustrated in FIG. 1 may be performed by a computing device or a server, which will be described later.

As shown in FIG. 1, the computing device generates security requirements for an NF based on a security profile and a deployment and runtime environment of the NF, as shown in block 101. In some embodiments, the security profile of the NF may comprise information related to characteristics of the NF, e.g. NF hardware and software technology and architecture information, functionalities, external and internal interfaces. The NF hardware and software technology and architecture information may indicate hardware and software technologies used for the NF and the architecture of the NF. The functionalities may specify the functions provided by the NF. The external and internal interfaces may indicate the external and internal interfaces and their configurations of the NF. According to the security profile of the NF, the related 3GPP or GSMA specifications or other specifications involving the NF security can be determined.

In some embodiment, the deployment and runtime environment of the NF may comprise information related to the deployment and runtime of the NF, e.g. a deployment country/region, an applied industry, a deployment mode, a running ecosystem, and additional requirements provided by an NF vendor, a network operator or a service provider. The deployment country/region may indicate a target country/region to be deployed, and thus the security laws and regulations in the deployment country/region can be determined. For example, if the deployment country/region is Europe, the related security laws and regulations include at least General Data Protection Regulation (GDPR). If the deployment country/region is China, the related security laws and regulations include at least Chinese Cybersecurity Law (CSL). The applied industry may indicate a target industry to be applied, and thus the industry specific standards and regulations relating to security can be determined. For example, the industry specific standards may include but not limited to Common Criteria (CC) and International Organization for Standardization (ISO) standards. Optionally, a security compliance level for the related law and regulation and the industry specific standard may be determined. For example, CC EAL+4 or level four of classified protection of information security may be determined. The industry specific regulations may include for example Federal Information Security Management Act (FISMA) in communication and e-commerce industries, Payment Card Industry Data Security Standard (PCI-DSS) in a financial industry, and Health Insurance Portability and Accountability Act (HIPPA) in a healthcare industry. The deployment mode may indicate that the NF is deployed as a physical node, a virtualized node (e.g. a virtual machine (VM)), or a hybrid node, etc. The running ecosystem may indicate a communication network in which the NF will operate. The communication network may be a public network, a private network, or a hybrid network. The additional requirements provided by a NF vendor, a network operator or a service provider may indicate special requirements from the NF vendor, the network operator and/or the service provider. Herein, the additional requirements may be also called as "organization polices".

Figure 3:
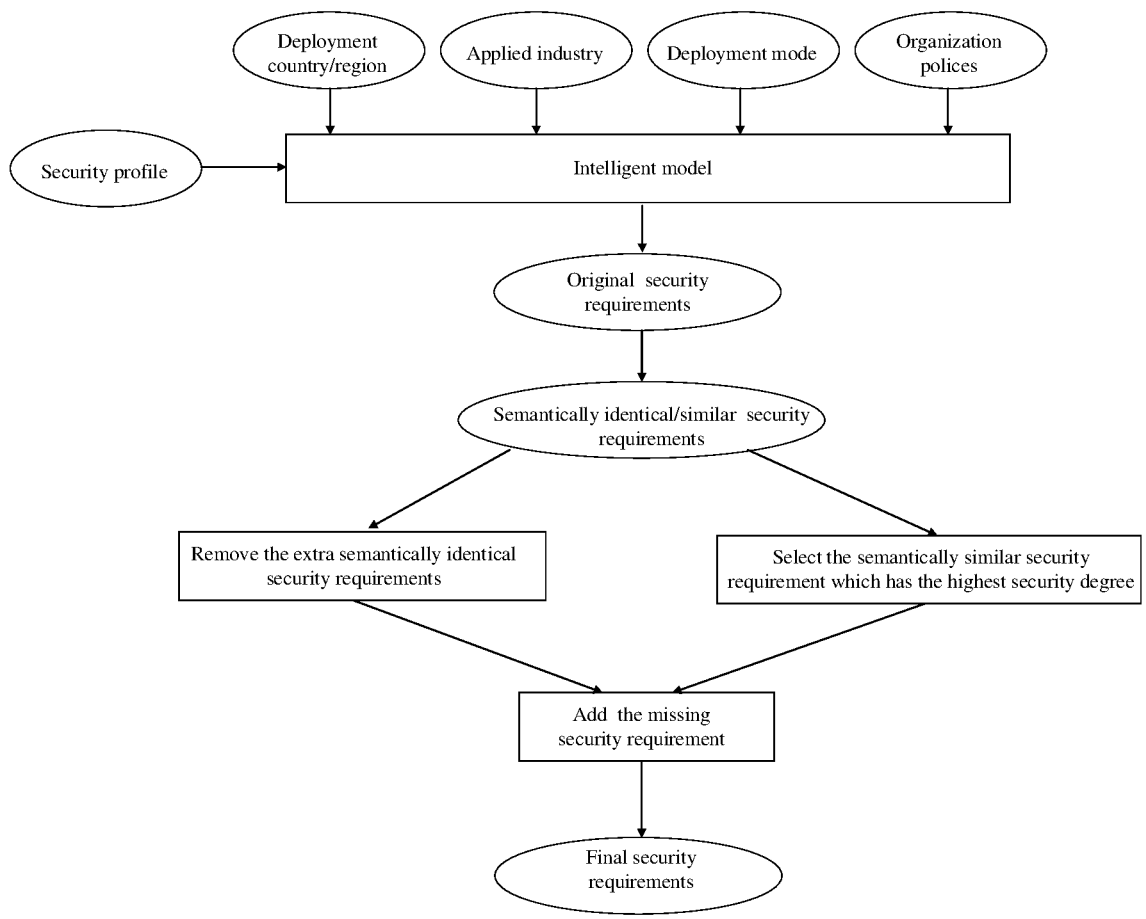
FIG. 3 is a diagram illustrating an exemplary implementation of the generation of the security requirements.

Next the generation of the security requirements will be described in detail with reference to FIGS. 2 and 3. FIG. 2 shows a flowchart illustrating a process of generating the security requirements as shown in the block 101, and FIG. 3 shows a diagram illustrating an exemplary implementation of the generation of the security requirements. In FIG. 3, the generation of the security requirements may be implemented in an intelligent model. The intelligent model may be based on artificial intelligence (AI) or machine learning (ML) technologies, such as natural language processing (NLP) technology. The intelligent model may include a learning phase and a prediction phase. During the learning phase, the intelligent model may learn internal representations of security requirements by applying an AI/ML tool (e.g. Natural Language Processing (NLP)) to the security laws and regulations, the industry specific standard and regulations, etc. The learning phase could be online or offline. After the learning phase, the intelligent model may be capable for prediction, i.e. identifying semantic identical or semantic similar security requirements.

As shown in FIG. 2, in block 201, the computing device may determine original security requirements according to the security profile and the deployment and runtime environment of the NF. In the exemplary implementation as shown in FIG. 3, the security profile of the NF, the deployment country/region, the applied industry, the deployment mode, and, optionally, the organization policies are input into the intelligent model, and the original security requirements may be determined based on these inputs by means of the intelligent model.

Then in block 203, the computing device may identify semantically identical security requirements and semantically similar security requirements from the original security requirements. In some embodiments, semantic similarities between the original security requirements may be calculated. In an embodiment, some ML tool may be used to calculate the semantic similarity, such as genSim, simHash, etc. In another embodiment, the semantic similarity between two security requirements may be calculated based on a distance of the internal representations of the security requirements, e.g. paragraph vectors. In this case, the semantic similarity may be represented as a distance between the paragraph vectors of the security requirements. Then the security requirements with the semantic similarity greater than a first threshold are identified as the semantically identical security requirements, the security requirements with the semantic similarity greater than a second threshold are identified as the semantically similar security requirements. The first threshold may be higher than the second threshold.

Then, in block 205, the computing device removes the extra semantically identical security requirements, which may be considered as a de-duplication operation. Thus, only one of the semantically identical security requirements would be kept in the final security requirements.

In block 207, the computing device combines the semantically similar security requirements into a combined security requirement, and the combined security requirement has the highest security degree. In some embodiment, a security degree of the security requirement may be represented by at least one of a granularity of the security requirement and a security level of the security requirement. In some embodiments, the semantically similar security requirements may be ranked based on the security degrees of the semantically similar security requirements. Then the semantically similar security requirement which has the highest security degree may be selected as the combined security requirement. The remaining semantically similar security requirements may be removed.

In some embodiments, the security degree may be represented by the granularity of the security requirement. For example, one security requirement indicates using National Commercial Cryptographic Algorithms, and another security requirement indicates using symmetrical cryptographic algorithms. Then the granularity of the former is coarse and the granularity of the latter is fine. Therefore, the latter will be selected as the combined security requirement. In some embodiments, the security degree may be represented by the security level of the security requirement. For example, three security requirements indicate using 16-bit, 32-bit, and 64-bit passwords respectively. In this case, the security level can be represented by the length of the password. Then the security requirement indicating 64-bit password used has the highest security level, and thus the security requirement indicating using the 64-bit password is selected as the combined security requirement.

Through the above described operations, the computing device can obtain the final security requirements which are the security requirements remained in the original security requirements after the de-duplication operation and the combining operation.

In addition, in some embodiments, a security requirement baseline may be predefined for the NF. The security requirement baseline may be used to check whether the generated security requirement is complete for the NF. The security requirement baseline may comprise default security requirements required for the NF. In FIG. 3, the computing device may check whether there is any missing security requirement in the generated security requirements based on the security requirement baseline by comparing the generated security requirements with the security requirement baseline. If the missing security requirement exists, the missing security requirement will be added to the generated security requirements, as shown in block 209 of FIG. 2.

Now referring back to FIG. 1, as shown in block 103, the computing device generates a security policy and a security test specification for the NF based on the generated security requirements in block 101. In some embodiments, the security policy may define one or more security functions and configuration of the security function(s). The configuration of the security function may comprise one or more configuration rules for the security function. The security test specification may define at least one security test for security compliance validation. In some embodiments, the generation of the security test specification may also be implemented in the intelligent model as above. In some embodiments, the security test may comprise a test case, one or more test tools which are used to execute the test case, a test schedule which defines a scheduling of the test case, and a test configuration for configuring the one or more test tools.

Then in block 105, the computing device may deploy the NF and the security function based on the security policy. As described above, the security policy defines the security function(s) and the configuration(s) of the security function(s). The computing device may deploy and configure the NF and the security function(s) for protecting the NF according to the security policy.

Then in block 107, the computing device validates the security compliance of the NF with the security test specification. In some embodiments, the validation is performed by executing the at least one security test defined in the security test specification.

In some embodiment, in the validation, for each of the at least one security test, the computing device may configure one or more test tools according to the test configuration. Then the computing device may execute the test case according to the test schedule to determine whether the security test is passed. If all of the at least one security test are passed, it is determined that the NF is in compliance with the security policy. If any one of the at least one security test is not passed, it is determined that the NF is not in compliance with the security policy.

In addition, in some embodiments, a security test report may be generated. The security test report may indicate that the NF is security compliance or security incompliance and, optionally, recommend a subsequent action if the NF is not in compliance with the security policy. For example, the subsequent action may be terminating the NF or update a security configuration of a security function for the NF. In some embodiment, the security test report may be generated based on a security report policy for the NF. In an embodiment, the security report policy may define formats and contents of the security test report, and may be generated based on the security requirements generated in block 101. Further, the security report policy may indicate a receiver of the security test report.

In block 109, if the NF is in compliance with the security requirements, the computing device activates the NF and the NF is in operation.

Additionally, in some embodiments, the computing device may store the generated security requirements, the security policy and the security test specification for the NF in e.g. a database, for the later use, e.g. the deployment of the NF, and the validation of security compliance.

Additionally, in some embodiments, upon the NF is activated, the computer device may monitor a security state of the NF regularly. In some embodiments, the security state may be monitored by checking the security compliance of the NF based on the security policy. The security state may comprise a safe state and an unsafe state. Then the computing device may generate a security monitoring report. In some embodiments, the security monitoring report may indicate the monitored security state and, optionally, recommend a subsequent action if the monitored security state is the unsafe state. The subsequent action may be, for example, terminating the NF, or triggering the updating of the security requirements. In some embodiments, the security monitoring report may be generated based on the security report policy. The security report policy may define formats and contents of the security monitoring report based on the security requirements generated in block 101. The security report policy may also indicate a receiver of the security monitoring report.

Additionally, in some embodiments, the computing device may generate a migration plan for the NF based on the security requirements generated in block 101 and a security report including the security test report and the security monitoring report.

Additionally, in some embodiments, the computing device may update the security requirements. For example, if the security profile of the NF changes or the deployment and runtime environment of the NF changes or the security state of the NF changes, the computing device may update/re-generate the security requirements based on the changed security profile or the changed deployment and runtime environment or the changed security state of the NF. Accordingly, the security policy, the security test specification, the security report policy and the migration plan will be updated based on the updated/re-generated security requirements. The update/re-generation process is similar to the generation of the security requirement as shown in FIGS. 1, 2 and 3.

Although the above described method is described for the security assurance automation with respect to the NF, it should be noted that the security assurance automation is a part of network and service automation, and thus the above described method can be extended to development and operation of network and services. Those skilled in the art will appreciate that the above-described method of the security assurance automation can be applied to other functional assurance and non-functional assurance (e.g. performance assurance) of functions (e.g. a network function, or a management function) and services, so as to facilitate end-to-end (E2E) service automation.

Figure 4:
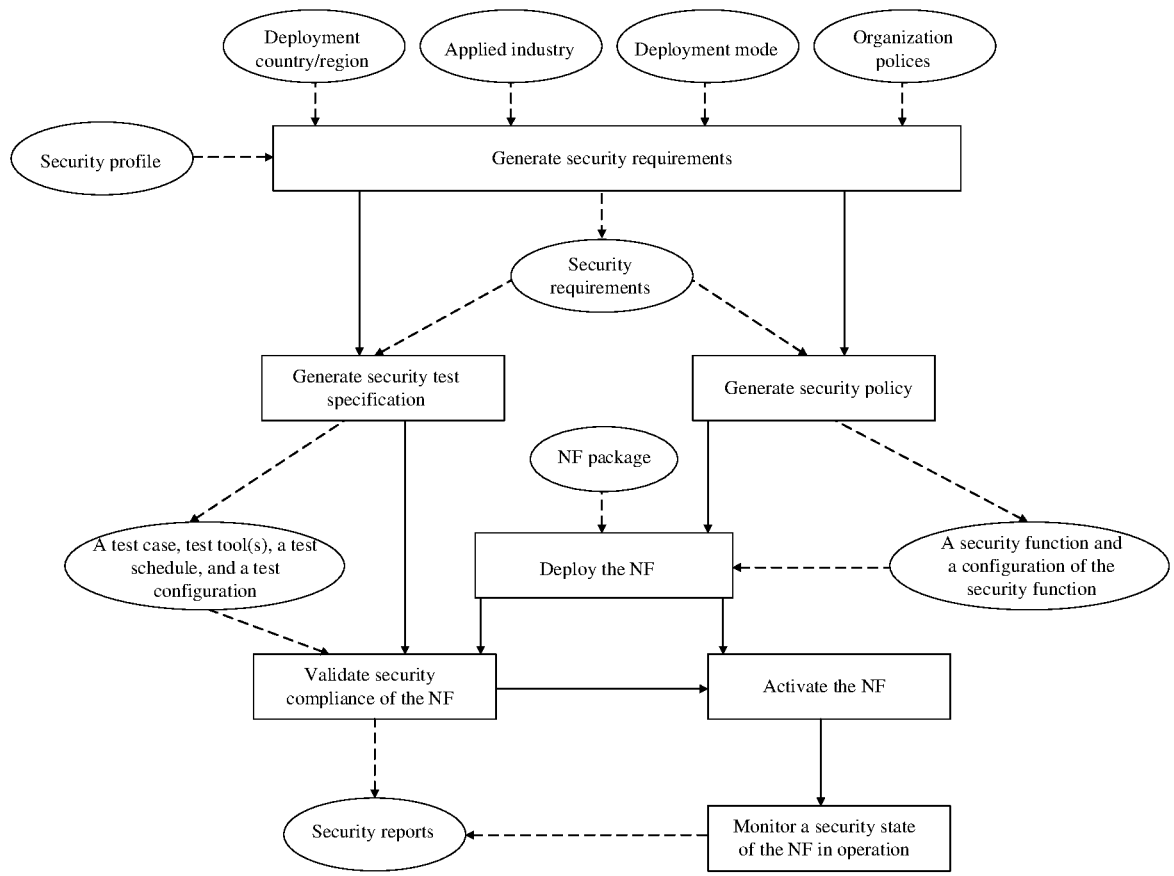
FIG. 4 is a diagram illustrating an exemplary implementation of the NF security assurance automation.

FIG. 4 is a diagram illustrating an exemplary implementation of the security assurance automation. As shown in FIG. 4, there are five inputs for the generation of the security requirements. They are the security profile, the deployment country/region, the applied industry, the deployment mode and, optionally, the organization polices. Upon the generation of the security requirements, the security policy and the security test specification are generated based on the generated security requirements. The security policy may define one or more security functions and the configuration of the security function(s). The security test specification may define at least one security test. Each security test may comprise the test case, one or more test tools for the test case, the test schedule, and the test configuration for the test tool(s). Then the NF and the security function may be deployed according to the security policy and NF package which comprises NF deployment related information, for example, software package, the deployment mode. Then the security compliance of the NF may be validated by executing the security test(s) in the security test specification, and the security test report may be generated. When the NF is validated to be in compliance with the security policy, the NF is activated to operate. During the NF is in operation, the NF may be continuously monitored for the security compliance, and the security monitoring report may be generated.

It can be seen from the above description that the methods according to the embodiments of the present disclosure can automate the security assurance automation of the NF during the whole NF development and operation lifecycle. It helps to simplify the work of an NF developer, validator and administrator, and unify a process of NF security accreditation and certification, while still guarantee the security of the NF even when it is deployed in various regions for different industries.

Figure 5:
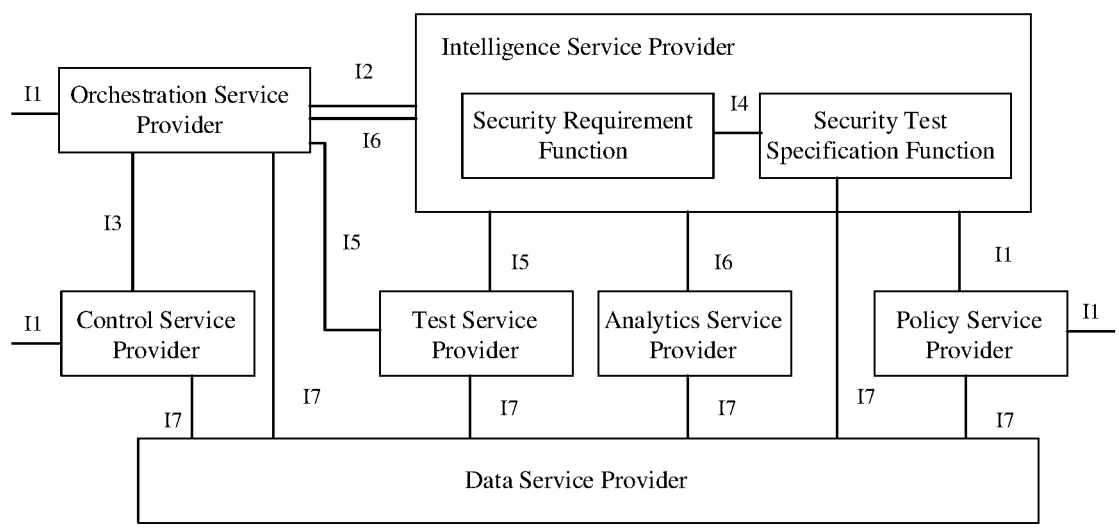
FIG. 5 is a diagram illustrating an exemplary network and service automation framework in which the method for NF security assurance automation according to some embodiments of the present disclosure can be implemented.

FIG. 5 is a diagram illustrating an exemplary network and service automation framework in which the method for security assurance automation according to some embodiments of the present disclosure can be implemented. The exemplary network and service automation framework may be based on an existing operation and management framework. In FIG. 5, the operation and management framework is based on European Telecommunications Standards Institute (ETSI) zero-touch network and service management (ZSM) architecture. Security assurance automation related function blocks and interfaces are added in the ZSM architecture.

As shown in FIG. 5, the framework comprises at least an intelligence service provider, an orchestration service provider, a control service provider, a policy service provider, a test service provider, an analytics service provider, and a data service provider.

A security requirement function can be embodied in the intelligence service provider. The security requirement function may provide services to generate and update the security requirements automatically and dynamically for a specific NF or management function (MnF) deployment as described above. The security requirement function can trigger the policy service provider to generate/update the security policy. The security requirement function can also trigger the orchestration service provider to execute the deployment of the NF or MnF based on the security policy.

A security test specification function can also be embodied in the intelligence service provider. The security test specification function may provide services to generate and update the security test specification automatically for a specific NF or MnF deployment as described above. The security test specification function can trigger the orchestration service provider to execute the security test for the security compliance validation.

The orchestration service provider may be enhanced by adding features to deploy the NF or MnF based on the security policy, to check whether or not the security requirements can be satisfied with existing resource, to trigger the deployment of the NF or MnF if the check passes, to trigger the validation of the security compliance of the NF or MnF with the security test specification. Alternatively, the above features may be embodied in a new function block for dedicated security orchestration.

The control service provider may be enhanced by adding features to control and manage the deployment of the NF or MnF, and to deploy and configure the NF or MnF according to the security policy as described above. Alternatively, the above features may be embodied in a new function block for dedicated security deployment management.

The policy service provider may be enhanced by adding features to generate/update/delete the security policy based on the security requirements as described above. It also provides features to solve a confliction between the security policy and other policies. Alternatively, the above features may be embodied in a new function block for dedicated security policy management.

The test service provider may be enhanced by adding features to validate the security compliance with the security test specification before activating the NF or MnF as described above. Alternatively, the above features may be embodied in a new function block for dedicated security testing. In this case, the new security testing function could reuse automatic test framework for general test cases with additional specific security test approaches. The security test may include a static security test, a dynamic security test, an interactive security test, a software compliance analysis and a penetration test.

The data service provider may be enhanced by adding features to support security data (e.g. the security requirements, the security policy, the security test specification, etc.) storage. It may be considered more strict security access control, isolation and protection because of sensitivity of the security data.

Next some new/impacted interfaces in the exemplary network and service automation framework as shown in FIG. 5 and their usages are described as follows.

I1 interface relates to security related services provided by the policy service provider, and may provide interfaces to the security requirement function, the orchestration service provider, the control service provider, and the test service provider.

I2 interface relates to security related services provided by the orchestration service provider, and may provide an interface to the intelligence service provider.

I3 interface relates to security related services provided by the control service provider, and may provide an interface to the orchestration service provider.

I4 interface relates to the security test specification function and may provide an interface to the security requirement function.

I5 interface relates to security related services provided by the test service provider, and may provide interfaces to the intelligence service provider and the orchestration service provider.

I6 interface relates to the security requirement function and may provide interfaces to the analytics service provider and the orchestration service provider.

I7 interface relates to security related services provided by the data service provider and may provide interface to the security test specification function, the orchestration service provider, the control service provider, the test service provider, the analytics service provider, and the policy service provider.

Figure 6:
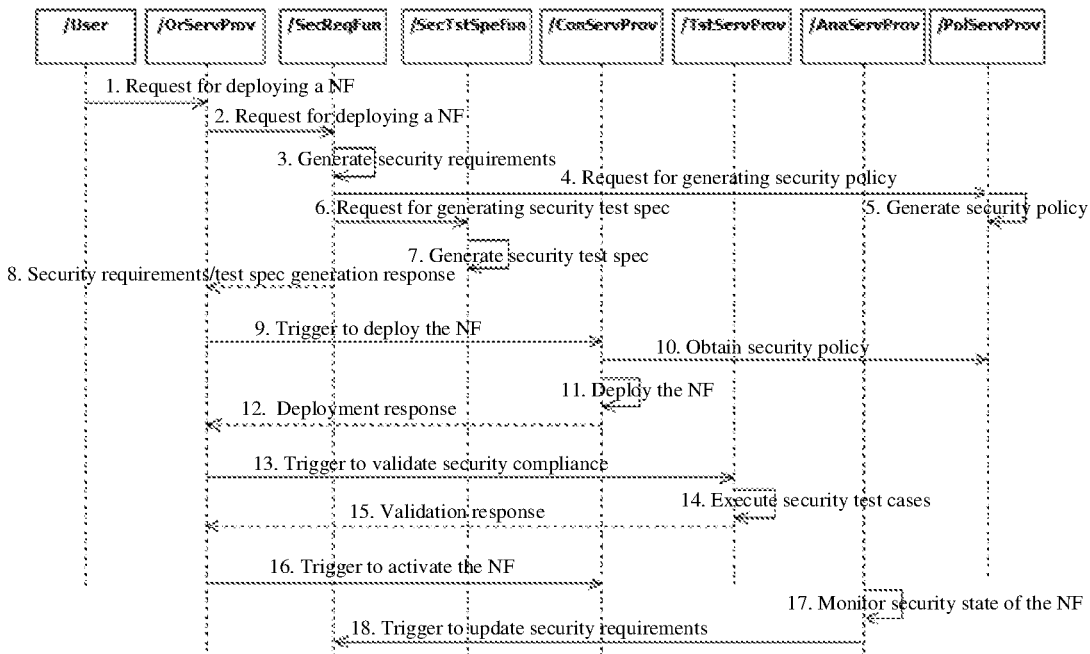
FIG. 6 is a diagram illustrating an exemplary workflow for NF security assurance in the network and service automation framework as shown in FIG. 5.

FIG. 6 is a diagram illustrating an exemplary workflow for NF security assurance in the network and service automation framework as shown in FIG. 5. The workflow is described as follows.

1. An administrator/user sends a request for deploying a target NF or MnF to the orchestration service provider OrServProv.

2. The orchestration service provider OrServProv sends a request for generating relevant security requirements for the target NF or MnF to the security requirement function SecReqFun.

3. The security requirement function SecReqFun generates the security requirements automatically according to security profile and deployment and runtime environment of the NF or MnF with AL/ML technologies.

4. The security requirement function SecReqFun asks the policy service provider PolServProv to generate the security policy for the target NF or MnF.

5. The policy service provider PolServProv generates the security policy based on the security requirements.

6. The security requirement function SecReqFun requests for generating the security test specification for the target NF or MnF from the security test specification function SecTstSpeFun. Alternatively, the generation of the security test specification may be triggered by the orchestration service provider OrServProv or by other management functions.

7. The security test specification function SecTstSpeFun generates the security test specification based on the security requirements with AL/ML technologies, and calls the data service provider to store the security test specification in a database.

8. The security requirement function SecReqFun makes a response to the orchestration service provider OrServProv that the security requirements and the security test specification are generated.

9. The orchestration service provider OrServProv triggers the control service provider ConServProv to deploy the target NF or MnF based on the security policy.

10. The control service provider ConServProv obtain the security policy from the policy service provider PolServProv.

11. The control service provider ConServProv deploys the security functions and configures security measures for the target NF or MnF.

12. The control service provider ConServProv makes a response to the orchestration service provider OrServProv that the target NF or MnF has been deployed.

13. The orchestration service provider OrServProv triggers the test service provider TstServProv to validate the security compliance of the target NF or MnF.

14. According to the security test specification retrieved from the data service provider, the test service provider TstServProv executes the security test(s) based on the security test specification.

15. The test service provider TstServProv reports the security test result to the orchestration service provider OrServProv.

16. According to the security test result, the orchestration service provider OrServProv triggers the control service provider ConServProv to activate the target NF or MnF if all the security tests pass. Otherwise, the orchestration service provider OrServProv triggers reconfiguration of security functions or termination of the target NF or MnF.

17. Upon the target NF or MnF is activated, the analytics service provider AnaServProv continuously monitors the security state of the target NF or MnF.

18. The analytics service provider AnaServProv triggers the security requirement function SecReqFun to update/re-generate/optimize the security requirements, so as to achieve a close loop automation for run-time security assurance.

Figure 7:
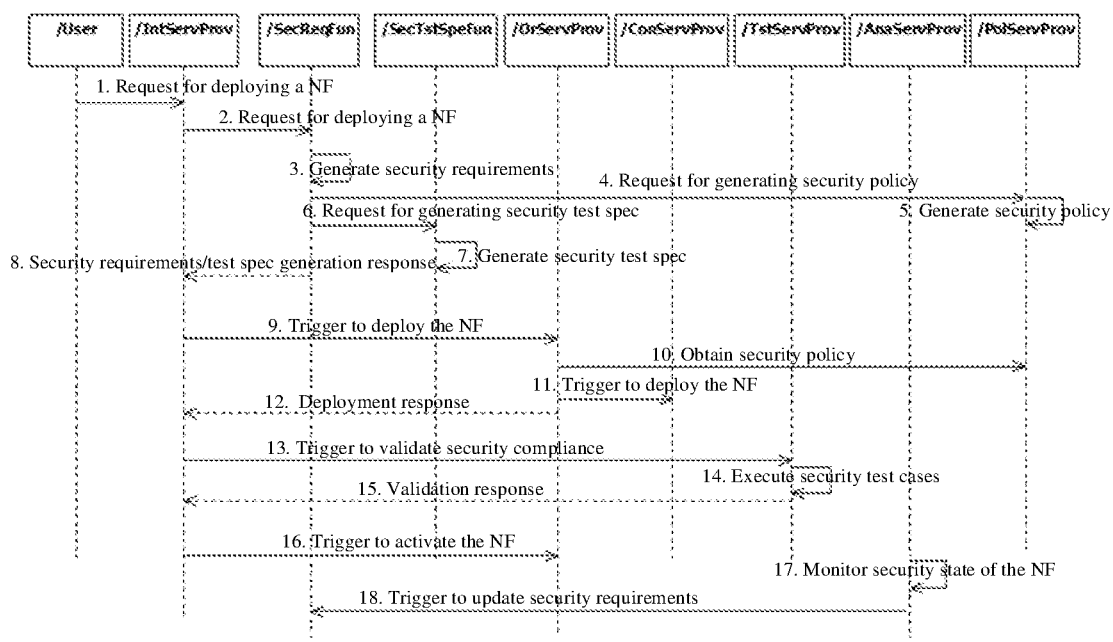
FIG. 7 is a diagram illustrating another exemplary workflow for NF security assurance in the network and service automation framework as shown in FIG. 5.

FIG. 7 is a diagram illustrating another exemplary workflow for NF security assurance in the network and service automation framework as shown in FIG. 5. In FIG. 7, the intelligence service provider drives the NF or MnF security assurance automation, instead of the orchestration service provider. The workflow is described as follows.

1. An administrator/user sends a request for deploying a target NF or MnF to the intelligent service provider IntServProv.

2. The intelligent service provider IntServProv sends a request for generating relevant security requirements for the target NF or MnF to the security requirement function SecReqFun.

3. The security requirement function SecReqFun generates the security requirements automatically according to security profile and deployment and runtime environment of the NF or MnF with AL/ML technologies.

4. The security requirement function SecReqFun asks the policy service provider PolServProv to generate the security policy for the target NF or MnF.

5. The policy service provider PolServProv generates the security policy based on the security requirements.

6. The security requirement function SecReqFun requests for generating the security test specification for the target NF or MnF from the security test specification function SecTstSpeFun. Alternatively, the generation of the security test specification can be triggered by the intelligence service provider IntServProv or by other management functions.

7. The security test specification function SecTstSpeFun generates the security test specification based on the security requirements with AL/ML technologies, and calls the data service provider to store the security test specification in a database.

8. The security requirement function SecReqFun makes a response to the intelligent service provider IntServProv that the security requirements and the security test specification are generated.

9. The intelligent service provider IntServProv triggers the orchestration service provider OrServProv to deploy the target NF or MnF based on the security policy.

10. The orchestration service provider OrServProv obtains the security policy from the policy service provider PolServProv.

11. The orchestration service provider OrServProv triggers the control service provider ConServProv to deploy the security functions and configure security measures for the target NF or MnF.

12. The orchestration service provider OrServProv makes a response to the intelligent service provider IntServProv that the target NF or MnF has been deployed.

13. The intelligent service provider IntServProv triggers the test service provider TstServProv to validate the security compliance of the target NF or MnF.

14. According to the security test specification retrieved from the data service provider, the test service provider TstServProv executes the security test(s) based on the security test specification.

15. The test service provider TstServProv reports the security test result to the intelligent service provider IntServProv.

16. According to the security test result, the intelligent service provider IntServProv triggers the orchestration service provider OrServProv to activate the target NF or MnF if all the security tests pass. Otherwise, the intelligent service provider IntServProv triggers reconfiguration of security functions or termination of the target NF or MnF.

17. Upon the target NF or MnF is activated, the analytics service provider AnaServProv continuously monitors the security state of the target NF or MnF.

18. The analytics service provider AnaServProv triggers the security requirement function SecReqFun to update/re-generate/optimize the security requirements, so as to achieve a close loop automation for run-time security assurance.

Figure 8:
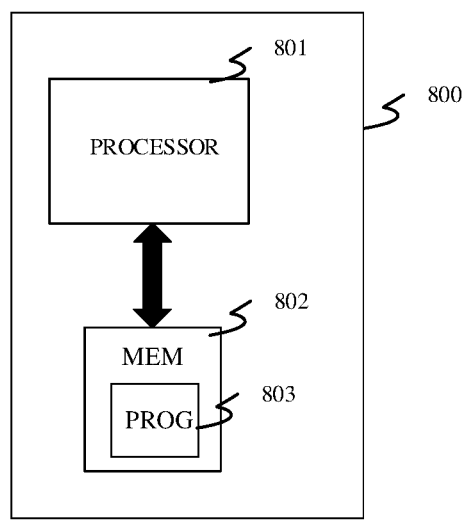
FIG. 8 is a schematic block diagram illustrating an apparatus for NF security assurance automation according to some embodiments of the present disclosure.

Reference is now made to FIG. 8, which illustrates a simplified block diagram of an apparatus 800 according to some embodiments of the present disclosure. The apparatus may be embodied in a communication system, such as a 5G system. The apparatus 800 is operable to carry out the methods as described with reference to FIGS. 1, 2, 3 and/or 4, and possibly any other processes or methods. It is also to be understood that any one of the above methods are not necessarily carried out completely by the apparatus 800. Some steps of the above methods may be performed by one or more other entities.

The apparatus 800 may comprise at least one processor 801, such as a data processor (DP) and at least one memory (MEM) 802 coupled to the processor 801. The MEM 802 stores a program (PROG) 803. The PROG 803 may include instructions that, when executed on the associated processor 801, enable the apparatus 800 to operate in accordance with the embodiments of the present disclosure, for example to perform the above methods. A combination of the at least one processor 801 and the at least one MEM 802 may form a processing means adapted to implement various embodiments of the present disclosure.

Various embodiments of the present disclosure may be implemented by computer program executable by the processor 801, circuitry, software, firmware, hardware or in a combination thereof. The processors 801 may be of any type suitable to the local technical environment, and may include one or more of general purpose computers, special purpose computers, microprocessors, digital signal processors DSPs and processors based on multicore processor architecture, as non-limiting examples.

The MEMs 802 may be of any type suitable to the local technical environment and may be implemented using any suitable data storage technology, such as semiconductor-based memory devices, magnetic memory devices and systems, optical memory devices and systems, fixed memory and removable memory, as non-limiting examples.

In addition, the present disclosure may also provide a carrier containing the computer program as mentioned above, wherein the carrier is one of an electronic signal, optical signal, radio signal, or computer readable storage medium. The computer readable storage medium can be, for example, an optical compact disk or an electronic memory device like a RAM (random access memory), a ROM (read only memory), Flash memory, magnetic tape, CD-ROM, DVD, Blue-ray disc and the like.

The techniques described herein may be implemented by various means so that an apparatus implementing one or more functions of a corresponding apparatus described with an embodiment comprises not only prior art means, but also means for implementing the one or more functions of the corresponding apparatus described with the embodiment and it may comprise separate means for each separate function, or means that may be configured to perform two or more functions. For example, these techniques may be implemented in hardware (one or more apparatuses), firmware (one or more apparatuses), circuitry, software (one or more modules), or combinations thereof. For a firmware, circuitry, or software, implementation may be made through modules (e.g., procedures, functions, and so on) that perform the functions described herein.

Embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

It will be obvious to those skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:

1. A method, comprising:
generating original security requirements for a network or management function based on a security profile and a deployment and runtime environment of the network or management function;
generating a security policy and a security test specification for the network or management function based on the security requirements;
deploying and configuring the network or management function based on the security policy;
validating security compliance of the network or management function with the security test specification; and activating the network or management function, in response to the network or management function being in compliance with the security policy;
wherein the method further comprises: updating the original security requirements in response to: a change to the security profile; a change to the deployment and runtime environment of the network or management function; a change to a security state of the network function; and an update request;
wherein the deployment and runtime environment comprises a deployment country/region; an applied industry; a deployment mode; a running ecosystem; and additional requirements provided by a network function vendor, a network operator and a service provider, and
wherein the security policy at least defines: a security configuration of the network or management function, a security function and a configuration of the security function.

2. The method according to claim 1, further comprising:
identifying semantically identical security requirements and semantically similar security requirements from the original security requirements, wherein semantic similarities between the original security requirements are calculated based on a distance of the internal representations of the original security requirements, wherein the semantic similarity is represented as a distance between a plurality of paragraph vectors of the original security requirements and security requirements with a semantic similarity greater than a first threshold are identified as semantically identical security requirements, and security requirements with a semantic similarity greater than a second threshold are identified as semantically similar security requirements, wherein the first threshold is higher than the second threshold;
removing extra semantically identical security requirements, wherein only one of the semantically identical security requirements is kept in the final security requirements;
combining the semantically similar security requirements into a combined security requirement, wherein the combined security requirement has the highest security degree.

3. The method according to claim 1, wherein the deployment mode indicates that the network or management function is deployed as one of a physical node, a virtualized node, and a hybrid node, and wherein the running ecosystem indicates that a communication network in which the network or management function will operate is one of a public network, a private network, and a hybrid network.

4. The method according to claim 1, wherein the generation of the security requirements and the security test specification are implemented in an intelligent model.

5. The method according to claim 1, wherein the security test comprises a test case, one or more test tools which are used to execute the test case, a test schedule which defines a scheduling of the test case, and a test configuration for configuring the one or more test tools.

6. The method according to claim 5, wherein validating security compliance of the network or management function based on the security test specification comprises:
for each of the at least one security test in the security test specification,
configuring one or more test tools according to the test configuration;
executing the test case according to the test schedule to determine whether the security test is passed; and
determining, in response to all of the at least one security test being passed, that the network or management function is in compliance with the security requirements; and
determining, in response to any one of the at least one security test being not passed, that the network or management function is not in compliance with the security requirements.

7. An apparatus, comprising:
at least one processor; and
at least one memory including computer executable instructions;
the at least one memory and the computer executable instructions configured to, with the at least one processor, cause the apparatus to:
generate original security requirements for a network or management function based on a security profile and a deployment and runtime environment of the network or management function;
generate a security policy and a security test specification for the network or management function based on the original security requirements;
deploy and configure the network or management function based on the security policy;
validate security compliance of the network or management function with the security test specification; and
activate the network entity, in response to the network or management function being in compliance with the security policy;
wherein the at least one memory and the computer executable instructions are configured to, with the at least one processor, further cause the apparatus to:
update the original security requirements in response to: a change to the security profile; a change to the deployment and runtime environment of the network or management function; a change to a security state of the network function; and an update request;
wherein the deployment and runtime environment comprises a deployment country/region; an applied industry; a deployment mode; a running ecosystem; and additional requirements provided by a network function vendor, a network operator and a service provider, and
wherein the security policy at least defines: a security configuration of the network or management function, a security function and a configuration of the security function.

8. The apparatus according to claim 7, wherein the at least one memory and the computer executable instructions are configured to, with the at least one processor, further cause the apparatus to:
identify semantically identical security requirements and semantically similar security requirements from the original security requirements, wherein semantic similarities between the original security requirements are calculated based on a distance of the internal representations of the original security requirements, wherein the semantic similarity is represented as a distance between a plurality of paragraph vectors of the original security requirements and security requirements with a semantic similarity greater than a first threshold are identified as semantically identical security requirements, and security requirements with a semantic similarity greater than a second threshold are identified as semantically similar security requirements, wherein the first threshold is higher than the second threshold;
remove extra semantically identical security requirements, wherein only one of the semantically identical security requirements is kept in the final security requirements;
combine the semantically similar security requirements into a combined security requirement, wherein the combined security requirement has the highest security degree.

9. The apparatus according to claim 7, wherein the deployment mode indicates that the network or management function is deployed as one of a physical node, a virtualized node, and a hybrid node; and
wherein the running ecosystem indicates that a communication network in which the network or management function will operate is one of a public network, a private network, and a hybrid network.

10. The apparatus according to claim 7, wherein the security test specification defines at least one security test.

11. The apparatus according to claim 7, wherein the generation of the security requirements and the security test specification are implemented in an intelligent model.

12. The apparatus according to claim 7, wherein the security test comprises a test case, one or more test tools which are used to execute the test case, a test schedule which defines a scheduling of the test case, and a test configuration for configuring the one or more test tools.

13. The apparatus according to claim 12, wherein the at least one memory and the computer executable instructions are configured to, with the at least one processor, cause the apparatus to:
for each of the at least one security test in the security test specification,
configure one or more test tools according to the test configuration;
execute the test case according to the test schedule to determine whether the security test is passed; and
determine, in response to all of the at least one security test being passed, that the network entity is in compliance with the security requirements; and
determine, in response to any one of the at least one security test being not passed, that the network or management function is not in compliance with the security requirements.

14. The apparatus according to claim 13, wherein the at least one memory and the computer executable instructions are configured to, with the at least one processor, further cause the apparatus to: generate a security test report which recommends a subsequent action if the network or management function is not in compliance with the security requirements.

15. The apparatus according claim 7, wherein the at least one memory and the computer executable instructions are configured to, with the at least one processor, further cause the apparatus to: monitor, upon the activation of the network entity, a security state of the network or management function in operation;
and generate a security monitoring report, the security monitoring report indicating the monitored security state and recommending a subsequent action if the monitored security state indicates an unsafe state.

16. The apparatus according to claim 7, wherein the at least one memory and the computer executable instructions are configured to, with the at least one processor, further cause the apparatus to: update the security requirements in response to: a change to the security profile; a change to the deployment and runtime environment of the network or management function; a change to a security state of the network function; and an update request.

17. A non-transitory computer readable storage medium storing thereon computer executable instructions which, when executed by a computer, cause the computer to perform:
generating original security requirements for a network or management function based on a security profile and a deployment and runtime environment of the network or management function;
generating a security policy and a security test specification for the network function based on the security requirements;
deploying and configuring the network or management function based on the security policy;
validating security compliance of the network or management function with the security test specification; and
activating the network entity, in response to the network or management function being in compliance with the security policy,
wherein the non-transitory computer readable storage medium storing thereon computer executable instructions which, when executed by a computer, further cause the computer to perform: updating the original security requirements in response to: a change to the security profile; a change to the deployment and runtime environment of the network or management function; a change to a security state of the network function; and an update request;
wherein the deployment and runtime environment comprises a deployment country/region; an applied industry; a deployment mode; a running ecosystem; and
additional requirements provided by a network function vendor, a network operator and a service provider and
wherein the security policy at least defines: a security configuration of the network or management function, a security function and a configuration of the security function.

* * * * *